Nov. 17, 1964 W. H. KUMM ETAL 3,157,834
SUBMINIATURE VARIABLE CAPACITOR
Filed July 6, 1961
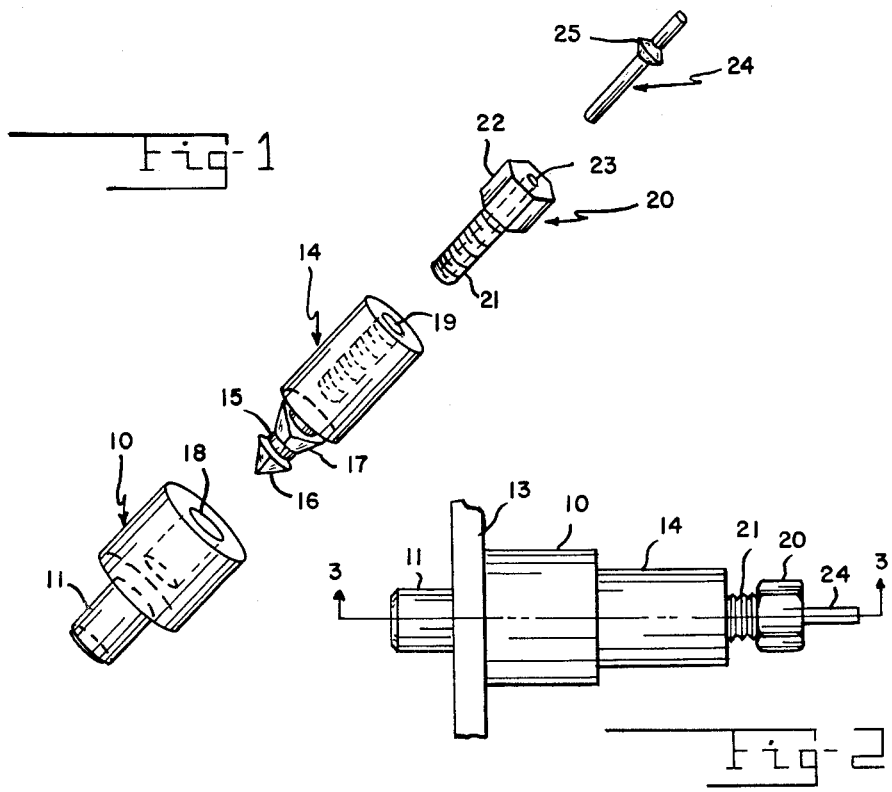
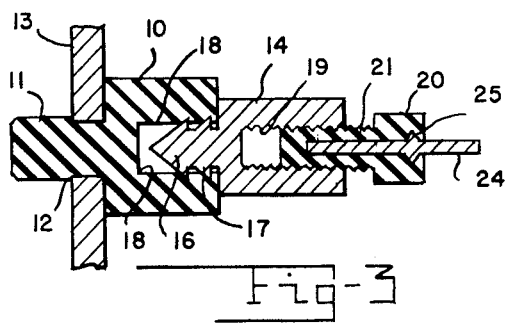
INVENTORS
WILLIAM H. KUMM
WILLIAM L. LETSCH
BY
ATTORNEY
AGENT

15

United States Patent Office 3,157,834
Patented Nov. 17, 1964

3,157,834
SUBMINIATURE VARIABLE CAPACITOR
William H. Kumm and William L. Letsch, Baltimore,
Md., assignors, by mesne assignments, to the United
States of America as represented by the Secretary of
the Air Force
Filed July 6, 1961, Ser. No. 122,364
1 Claim. (Cl. 317—249)

This invention relates to a subminiature variable capacitor for use in high frequency tuned circuits.

One object of the invention is to provide a variable capacity element capable of obtaining a minimum capacity of 0.1 $\mu\mu f$.

Another object of the invention is to provide a subminiature variable capacitor which is substantially temperature and mechanically stable.

A further object of the invention is to provide a subminiature variable capacitor element capable of being mounted on a chassis so that the capacitance between the terminals of the capacitor element and the chassis does not exceed the capacitance between the electrodes of the capacitor by a great amount.

These and other objects will be more fully understood from the following detailed description taken with the drawing, wherein:

FIG. 1 shows an exploded perspective view of the variable capacitor of the invention;

FIG. 2 shows a side view of the assembled device of FIG. 1 mounted on a panel; and, FIG. 3 shows a sectional view of the device of FIG. 2 along the line 3—3.

The principal use for a physically small, low capacity variable capacitor is in the neutralization of the interelectrode capacity of vacuum tubes in high frequency tuned amplifiers. The order of capacity necessary for this purpose is from 0.1 $\mu\mu f$. to about 1.5 $\mu\mu f$. depending on the circuit. There are some relatively small commercially available capacitors having a minimum capacity of 0.5 $\mu\mu f$., however, this is too much for some of the circuits aside from the fact that these capacitors have to be mounted mechanically which requires considerable space in order that the capacity from either of the terminals to the chassis ground of the tuned amplifier shall not be many times greater than that between each of the terminals of the unit.

Referring more particularly to FIG. 1 of the drawing, reference number 10 refers to a dielectric stand-off member made of a material such as polytetrafluoroethylene, known in the art as Teflon having a projection 11 thereon for mounting the capacitive element on the chassis indicated generally at 13 in the manner shown in FIGS. 2 and 3. The diameter of the projection 11 on member 10 should be slightly larger than the opening 12 in chassis 13 so that the cold flow properties of the Teflon may be used for securing the capacitor.

A brass plug 14 having a projection 15 with two square tapered securing projections 16 and 17 thereon is received and retained in a central bore hole 18 in the stand-off member 10. The square projections 16 and 17 secure the plug to the stand-off to prevent rotation of the brass plug 14 in the stand-off 10. The brass plug 14 has a threaded central bore hole 19 therein for receiving a Teflon spacer member 20. The outer diameter of the projection 21 on spacer member 20 is made slightly larger than the larger diameter of threaded bore hole 19 to provide a tight fit between members 20 and 14 when the spacer 20 is threaded into the bore 19. A hexagonal head 22 is provided on member 20 which is used to vary the capacity.

A central bore hole 23 is provided in the spacer member 20 for receiving a steel pin 24. The outer diameter of pin 24 is slightly larger than bore hole 23 to provide a tight fit. A shoulder 25 on steel pin 24 is for retaining the pin in member 20. Pin 24 is free to rotate in member 20 because of the lubricating property of Teflon so that the circuit lead wire (not shown) when connected to pin 24 does not have to accommodate rotation. The other lead (not shown) is connected to brass plug 14.

In the operation of the variable capacity element of this invention, pin 24 is moved with respect to brass plug 14 by turning the spacer member 20 in the screw threads in member 14.

As described above, due to the lubricating properties of Teflon there is substantially no rotation of the pin as the capacity is changed. The tight fit of the various elements makes the capacitor sturdier and less subject to capacity change with temperature changes and vibration. Use is made of the cold flow properties of Teflon in making the tight fits. While threads are shown on projection 21 these need not be precut but rather the Teflon spacer may be permitted to thread itself as it is turned into the threaded bore 19.

While this device has been described with an insulator stand-off type of support, the bore hole can be provided through the projection 11 on element 10 to provide a feed through type insulator support.

There is thus provided a subminiature variable capacitor for use in high frequency tuned circuits.

While certain specific embodiments have been described in detail, it is obvious that numerous modifications may be made without departing from the general principle and scope of the invention.

We claim:

A subminiature variable capacitive device comprising: an elongated metal body having a bore hole centrally located and threaded along a substantial length of the longitudinal axis of said metal body, a polytetrafluoroethylene spacer member retained within said centrally located and threaded bore hole, said spacer member having a cylindrical bore hole, a metal pin having a circular cross-section snugly fitted within said cylindrical bore hole of said spacer member, a raised shoulder on said metal pin for securing said pin in said spacer, means on said spacer for rotating the spacer within said centrally located and threaded bore hole for adjusting the axial position of said metal pin with respect to said elongated metal body, a second polytetrafluoroethylene support having a central bore hole therein, means on said elongated metal body for engaging said bore hole within said second polytetrafluoroethylene support for securing said elongated metal body to said second polytetrafluoroethylene support and a mounting projection on said support at the end remote from said metal body.

References Cited by the Examiner
UNITED STATES PATENTS

| 1,632,130 | 6/27 | Haddock | 317—249 |
|---|---|---|---|
| 2,677,794 | 5/54 | Gutterman | 317—249 |
| 2,774,017 | 12/56 | Shapp et al. | 317—249 |

FOREIGN PATENTS

| 212,199 | 3/24 | Great Britain. |
|---|---|---|

E. JAMES SAX, Primary Examiner.

JOHN F. BURNS, Examiner.